United States Patent [19]

Saul

[11] 4,120,323

[45] Oct. 17, 1978

[54] POLYGONALLY WRAPPED SLEEVE, AND METHODS AND DEVICES FOR MAKING SAME

[76] Inventor: Franz J. Saul, Gürzenicher Str. 61, 5160 Düren, Germany

[21] Appl. No.: 579,058

[22] Filed: May 20, 1975

[30] Foreign Application Priority Data

May 20, 1974 [DE] Fed. Rep. of Germany ....... 2424413

[51] Int. Cl.[2] ......................... F16L 11/00; B31C 3/00; B65H 81/00; B65D 3/00

[52] U.S. Cl. .................................. 138/129; 138/119; 138/154; 138/178; 93/94 PS; 156/190; 229/4.5; 229/DIG. 4; 428/36

[58] Field of Search ................. 138/119, 129; 229/4.5, 229/41 C, 41 B, DIG. 4; 428/36; 93/39.1 P, 58 ST, 94 PS

[56] References Cited

U.S. PATENT DOCUMENTS

| | | | |
|---|---|---|---|
| 2,016,273 | 10/1935 | Atwood | 138/129 |
| 2,709,400 | 5/1955 | Bugg | 93/80 |
| 2,765,716 | 10/1956 | Andersson | 98/53 ST |
| 3,104,599 | 9/1963 | Carpenter, Sr. | 229/4.5 |
| 3,343,567 | 9/1967 | Mulligan et al. | 138/119 |
| 3,457,130 | 7/1969 | Morrison | 229/4.5 |
| 3,508,587 | 4/1970 | Mauch | 138/119 |
| 3,526,566 | 9/1970 | McIlvain, Jr. et al. | 98/53 ST |
| 3,735,674 | 5/1973 | Haddock | 98/53 ST |
| 3,818,948 | 6/1974 | Hedges | 138/119 |

FOREIGN PATENT DOCUMENTS

| | | |
|---|---|---|
| 1,943,097 | 3/1971 | Fed. Rep. of Germany. |
| 1,001,582 | 1/1957 | Fed. Rep. of Germany. |
| 1,119,280 | 6/1956 | France. |

*Primary Examiner*—William R. Dixon, Jr.
*Attorney, Agent, or Firm*—William G. Rhines

[57] ABSTRACT

The invention relates to packaging "sleeves," or multi-sided, tubular structures which may be used for packaging articles, as blanks for boxes, or the like, which are made from multiple layers of spirally wrapped strips of paper, fabric, or the like; which sleeves may have discrete corners at the junctures of their sidewalls, which corners may be permanent where rididity is desired, or foldable so that the sleeves may be flattened for storage and/or shipment. Such sleeves may be made by apparatus, and/or utilizing methods, in accordance with the present invention, which contemplates the formation of a substantially cylindrical core over a cylindrical spindle, and transfering the core to axially oriented lines of rollers which are oriented radially to the axis of the spindle at sequentially increasing distances therefrom, whereby the sleeve, while still softened from the application of glue to its constituent layers, may be permanently distorted into its desired multi-sided, multi-cornered configuration, with desired radii at the corners and such grooves as may be desired to augment hinging to facilitate flattening of the sleeves.

10 Claims, 10 Drawing Figures

A
B
C
1
2
3
4
4'
5
6
9
10
11
12
13
14
15
18
19
20
21
22
23
24
25
30
31
32

POLYGONALLY WRAPPED SLEEVE, AND METHODS AND DEVICES FOR MAKING SAME

BACKGROUND OF THE INVENTION

This invention relates to a polygonal packaging sleeve, more specifically to spiral packaging sleeves of layers of paper, synthetic fabrics or similar material, arranged one above the other and glued to each other, and to methods and devices for producing same.

Polygonal packaging sleeves are well known for space saving is an empty and full state, as opposed to the commonly used round packaging sleeves. However, transportation and storing of these sleeves before loading is so bulky that production thereof is only profitable when a small area is serviced, so that production of bigger quantities is limited. On the other hand, wrapped sleeves, as compared to folding cartons, have a substantially higher strength and superior rigidity, because they are made of individual layers of paper which are wrapped around. They can, therefore, not only be used as bigger containers, such as for powdered laundry detergent, but also for heavy machine parts and in sizes up to a few meters. The folded cartons commonly used break or tear easily at their glued or folded edges.

The commonly known packaging sleeves are wound from a plurality of strips of previously glued material. The strips are helically wound around a stationary spindle, whereby each strip is staggered laterally in the longitudinal direction of the sleeve. In order to produce such a multiplestage sleeve, a so-called spiral package-sleeve-machine is used, whereby the individual strips are pulled off from rolls. Before winding the wrapping strips around the spindle, they are glued; i.e. they are pulled on both sides through a tub of glue, by a dipping process, or on one side by a single glueing process. They are then carried over a roller which applies glue. The wall thickness of the spiral sleeves manufactured in this manner results from the number of the strips wrapped over each other and from the volume of the strip material.

The sleeve production takes place by the means of an endless belt which is rotated by two revolving heads. The belt forms a loop around the glued strips which are wrapped around the spindle and, by revolving, effects a pulling out of the wrapping material from the delivery rolls to the spindle, the tightening of the glued wrapping material against each other in order to glue it together, and the horizontal pushing off of the endless round sleeve which has been formed in this manner. The severing of the sleeve, in the desired places, takes place in such a manner than the sleeve runs against a buffer (plate) which is connected by means of a rod to a circular saw. At first the sleeve runs past the saw which is in resting position. Only when the sleeve is bearing on the buffer is the saw advanced horizontally and guided over a cam into the wall of the sleeve. The cutting process is finished as soon as the sleeve has rotated around its axis. According to another method of manufacturing round sleeves by cross wrapping or parallel wrapping, the paper web is pulled off a paper roller. Both paper edges can be buffed by a buffing device for the purpose of later glueing them to the sleeve on the inside and on the outside. Subsequently, glue is put on one side of the paper web, which is constantly pulled off and it is separated by a cross-cutting knife. The now loose paper web, which in its length is the sleeve length to be wrapped, in guided on one side onto a split spindle. The spindle starts to rotate after the paper web has been inserted and thereby wraps the paper laterally to the paper web but in the direction of the fiber of the paper. The desired thickness of the sleeve wall determines the width of the paper web and the thickness of the paper in this method of parallel wrapping. After the wrapping process is completed, the parallel sleeve formed in this manner is pushed off the spindle which is now in resting position to accept the next paper web, by means of a transfer conveyor.

A means for producing spirally wrapped sleeves with polygonal cross-sections is already known. On the spiral sleeve wrapping machine, a rotatable polygonal spindle is used instead of the stationary round wrapping spindle. On this rotatable polygonal spindle, just as in the case of producing a round sleeve, the preglued wrapping material is applied and is manufactured with the endless belt, as already described. In order that the sleeve can glide over the polygonal spindle, elongated horizontal slide bars are mounted on to the corners of the spindle, which bars decrease the contact area. The sliding areas of the bars must of course be well lubricated so that the horizontal movement of the sleeve is possible.

Economical production with high speed is not possible on a rotating polygonal spindle because the sliding areas decrease tge conveyability of the sleeve very much. Therefore, a constant bunching-up of the sleeve wall to the wrapping belt occurs.

Moreover, the belt in the case of a polygonal spindle moves constantly towards the saw and back again. This effect, also called pumping, results in the fact that the sleeves can only be produced with low speed and are only shaped polygonally but are not foldable.

Since the previously-mentioned manufacture of polygonal sleeves is disadvantageous, West German Pat. No. 1 943 097 describes another method for the continuous manufacture of spirally wrapped sleeves with polygonal cross section. This method of manufacturing is such that on a stationary spindle with a circular cross-section a round sleeve is produced, according to a known, already described method. The cylindrical sleeve so produced ends, when 50–100 cm in length, into a first rotary head. The sleeve is guided through rolls in this rotary head and is shaped by impressing it onto a rotary spindle with a polygonal cross section. Thereafter, further strips are wrapped onto the polygonal sleeve in order to give the sleeve the desired wall thickness. Subsequently, the sleeve, which has its wall thickness increased by further glued-on strips, is guided between the rolls of a second rotary head until finally the completed sleeve can be guided to the separation device. The sleeve manufactured in this manner requires an additional, expensive device with its own motor which has to run in synchronism with the wrapping sleeve machine, since, in this method of manufacturing, the sleeve has to be constantly pushed over a long, polygonal spindle and through two rotary heads with contact pressure, whereby additional strips still have to be applied, a constant friction on the spindle with polygonal cross section takes place, which also prevents economic manufacture.

According to such a manufacturing method, also known from French Pat. No. 1 119 280, packaging sleeves with polygonal cross section are known. However, various considerable disadvantages exist in the manufacture of these. The friction force which results from the passing over to the polygonal spindle is so considerable, that only a small manufacturing output can be realized with this method and furthermore, only wrapped sleeves limited to smaller wall thicknesses can be produced. In order to keep the friction on the polygonal spindle at a minimum, the edges of the spindle have to be kept comparatively sharp-edged. In addition, when employing this known method, the wrapped tube is visibly considerably distorted by pushing on to the polygonal spindle. It should here be taken into consideration that the wrapped sleeve has a deformable softened characteristic because of the glue.

Because of these influences, the sleeves manufactured in this known manner are comparably limited by size of their rounded-off edges.

Even when, as described in the cited U.S. Pat. No. 2,709,400, the formation of a polygonal cross section takes place through a roll which is forced against a roundly-wrapped sleeve from the outside, whereby comparatively sharply-edged sleeve cross-sections result. Specifically, this method is also mechanically not economical, i.e., primarily because the total roll-deformation device which is arranged outside the wrapped sleeve, has to rotate with a high wrapping speed, so that a considerable limitation of the wrapping performance exists.

It is an object of this invention to provide a polygonal packaging sleeve, the manufacture of which is considerably simplified and inexpensive and which can be done with little consumption of energy, so that its walls remain in this process smooth and without wrinkling along its longitudinal edges, whereby polygonal packaging sleeves can be manufactured not only cheaper in bigger manufacturing units, i.e. favorably priced, but also additionally will be economical in space when transported and stored in an empty state.

SUMMARY OF THE INVENTION

Desired objectives may be achieved through practice of this invention, articles embodying which include packaging "sleeves," or multi-sided tubular structures which may be used for packaging articles, as blanks for boxes, or the like, which are made from multiple layers of spirally wrapped strips of paper, fabric, or the like; which sleeves may have discrete corners at the junctures of their sidewalls, which corners may be permanent where rigidity is desired, or foldable so that the sleeves may be flattened for storage and/or shipment. Such sleeves may be made by apparatus, and/or utilizing methods, in accordance with the present invention, which contemplates the formation of a substantially cylindrical core over a cylindrical spindle, and transferring the core to axially oriented lines of rollers which are oriented radially to the axis of the spindle at sequentially increasing distances therefrom, whereby the sleeve, while still softened from the application of glue to its constituent layers, may be permanently distorted into its desired multi-sided, multi-cornered configuration, with desired radii at the corners and such grooves as may be desired to augment hinging to facilitate flattening of the sleeves.

Therefore, the invention consists of a packaging sleeve of the kind mentioned previously in which the longitudinal edges are developed by the roll deformation of the sleeve in longitudinal direction.

A sandwich-kind strengthening of the longitudinal edges results from roll deformation in the glue-moist state and any wrinkling of the layers which are exposed to the forming tool is prevented.

In its non-foldable shaped embodiment the longitudinal edges show in their cross section a well-rounded and hard-to-bend shape, whereby not only the mounting of flanged front-end closures is possible (the flanging machine implies the presence of a minimum curving radius) but also a high degree of resistance against cross-sectional deformation results, especially for specifically heavy articles. Packaging sleeves, according to this invention, have an optimum edge stability.

In another embodiment, a polygonal packaging sleeve is developed in such a manner that its longitudinal edges are foldable or exhibit a foldable edge, and can be folded flat in cross section.

In an advantageous embodiment of this invention the foldable polygonal packaging sleeve is characterized by exhibiting, in the enclosed corners of its longitudinal edges, impressed longitudinal grooves in the sleeve wall.

Accordingly, the sleeve can also have impressed longitudinal grooves into the sleeve wall in the external corners of its longitudinal edges.

Additionally, in close proximity to the impressed longitudinal grooves of the longitudinal edges, two longitudinal grooves can be positioned on the other side of the wall.

It can also be of advantage if two grooves on both sides of the longitudinal grooves are arranged in close peripheral proximity and are separated from each other and are opposite an individual longitudinal groove which is positioned in the interior corner of a longitudinal edge of a polygonal packaging sleeve, but on the external corner of this longitudinal edge.

On the other hand two grooves can also be positioned in close proximity to each other, impressed on both sides of the interior corner of a longitudinal edge of a polygonal wrapping sleeve, opposite an individual longitudinal groove in the external corner.

According to the invention, a method is disclosed for the manufacture of the mentioned polygonal wrapping sleeve, specifically a spirally wound packaging sleeve, whereby on a stationary spindle a round sleeve, made of glued layers of paper which are wrapped over each other and subsequently, are formed from the inside into a polygonal cross section, is characterized by the fact that the round wrapping sleeve within the area of the edges of the polygonal cross section undergoes a radially outward directed deformation by rolls in the longitudinal direction of the sleeve.

If the sleeve walls are thick, it is advantageous that the roll deformation take place step by step, in roll deformation stages which follow one after another, whereby the beginning roll deformation stages take place from time to time with consecutive radially enlarged inner diagonal members of the polygonal cross section.

A foldable polygonal packaging sleeve, for instance a packaging sleeve with a square cross section, is manufactured in such a manner that the sleeve, while undergoing deformation to the polygonal cross section while in the glue-moist state, gets foldable longitudinal edges, since when deforming the round wrapping sleeve in the state of softness by applying glue, at least one groove can be impressed into the sleeve wall.

Above all, the groove should be positioned in the interior corner of the longitudinal edge.

On the other hand it is also possible to juxtapose only one longitudinal groove to two impressed grooves on the opposite external corner, which grooves are in close proximity to each other on both sides of the interior corner of a longitudinal edge of a polygonal packaging sleeve.

Basically, it is crucial that the wrapping sleeve gets foldable longitudinal edges simultaneously with the deformation to the polygonal cross section in the glue-moist state, and that the imprinted grooves in the sleeve wall are impressed by a milling method, in longitudinal direction, on the external opposite corner.

A packaging sleeve according to this invention which has folding hinges on its longitudinal edges is flat foldable immediately after manufacture, for instance into a square profile in the simplest manner, and is economically transportable and storable without losing its specific advantages, i.e. great rigidity and resistance to tearing, even in large sizes and with heavy loads. When in use, the sleeve is simply erected from the flat state, whereby it receives its shape-rigidity in the simplest manner by the insertion or lowering of a cover in the front opening. Furthermore, punching procedures can be easily undertaken on a sleeve according to this invention in its folded state, as for instance, the punching of holes in the side walls or the punching out of closure flaps on the ends. Also, the foldable polygonal packaging sleeve can, in its flat state, be cut into shorter lengths.

Although the packaging sleeves often show, in comparison to the folded cartons, a comparable greater thickness, it has been evident, surprisingly, that the folded hinges which result from scoring, are fully capable of functioning and, above all, are stronger than those with normal folding cartons, perhaps because the many paper wrappings one over another are opened partially by the process of folding while glue-wet and therefore do not break, whereas in the case of folded cartons, the comparable short fiber length of the carton material is inclined to break or tear at the folded edges.

Further, the manufacture of foldable wrapping sleeves can be accomplished with a smaller expenditure of production efforts than in the case of folding cartons and above all, in a far simpler and quicker manner can be converted to various formats or sizes. In this manner a foldable packaging sleeve in accordance with this invention is suitable, for instance, to replace completely the usual round sleeve. This sleeve is a new, economically manufactured foldable packaging product, which in the same process may be made with impression (printing) carrier laminates wrapped with special paper, is foldable, and can be stacked. Especially in the case of rush orders can this product be delivered, after 12 hours at the most. This is an enormous advantage as compared to a folding carton which has to be first imprinted, punched, formed and glued.

Therefore, the production of a foldable wrapping sleeve can, for instance, start within an hour of receiving the order, with a printed wrapper as a label on the sleeve, and a water or grease resistant strip in the sleeve (i.e. bitumen paper), preferably during the wrapping process which at the same time the laminating process, can be glued on without any additional expenditure. Or, as a base strip, an aluminum strip can be processed which, at the same time, is a protection against moisture.

The apparatus for carrying out these methods should not only be constructively less expensive but should also guarantee a high production performance and better quality of manufactured polygonal packaging sleeves.

A stationary wrapping spindle on which the material to be wrapped can be wound and onto an extension of which a coaxial rotatable spindle is connected, which receives the wrapping sleeve and presses the wrapping sleeve continuously into the polygonal shape by slowly expanding the cross section, is characterized in that the rotatable spindle has at least two rows of rollers on opposite sides, the extended median plane of which cuts the axis of the spindle, and in which the rollers are arranged in rows and diverge radially outwards from the start of the rotatable spindle.

By using roll forming tools along the edges of the polygonal cross section, not only is use made of the rolling friction, but also the deformation forces are exclusively concentrated on the edge area. Because of excluding friction, additional buckling of the tube in front of the deformation station is avoided. A stretching of the flat sides of the polygonal cross section through the edge roll shaping also takes place, so that flat sides can be achieved smoothly by only the deformation from the inside of the wrapping sleeve.

The polygonal wrapping sleeves produced by a method of this invention can be manufactured not only with considerable thickness but also with various rounded edges, according to any roller curving radius, i.e. without making manufacturing impossible because of a too large friction area.

In the manufacture of a wrapping sleeve by means of the mentioned cross or parallel wrapping, the rotatable spindle is placed in a rotatable state in the end part of the parallel wrapping spindle.

Therefore, for a thicker wall it is advantageous for the rollers to be arranged on the second part which is connected to the first part of the spindle, with the same radial distance from its longitudinal axis.

With this invention it is possible not only to produce non-foldable polygonal packaging sleeves having longitudinal edges which show a big edge curvature radius, but also polygonal packaging sleeves by the use of rollers which are contoured differently, and which sleeves can be folded together at their longitudinal edges.

As much as it is desired to have a polygonal cross section with sharp edged corners for the sake of saving space, edges rounded off with a larger curvature radius prove to have an optimum edge stability, specifically in the case of heavy contents (for instance a shaft) for which the wrapped sleeves are especially suitable, because of its considerable strength.

The manufacture of packaging sleeves having a larger edge curvature radius is also advantageous for the following reason; the sleeve can be provided with sheet-metal cover of clasps around the front edge which are mechanically flanged around. On the known sharp-cornered polygonal sleeves this is not possible because the flange machines require the presence of a minimum curvature radius.

Finally, the interior edge area of a sleeve according to this invention is especially smooth because, when the roll deformation takes place, a buckling and wrinkling of the upper layers of paper is practically precluded.

In the case of non-foldable packaging sleeves according to this invention, the rollers can produce circumferential edges with a larger curve radius.

For the manufacture of foldable packaging sleeves, however, the rollers are constructed as groove-rollers with a peripheral rim which is impressed into the glue-wet sleeve wall.

A preferred embodiment of the invention additionally has groove rollers which are added to at least some groove rollers on the spindle and which are opposite to said spindle rollers but on the outer surface of the sleeve wall, whereby a single groove roller is mounted on the surface of the sleeve wall between pairs of groove rollers on the spindle which are in a close axial proximity to each other.

On the other hand, it is also within the concept of this invention, if at times, two groove rollers are provided which are arranged in close axial proximity to each other and opposite to at least some of the various groove rollers which are attached to the spindle on the surface of the sleeve wall, whereby the two groove rollers are in a peripheral distance to both sides of one groove roller.

If several rollers or groove rollers are provided on the rotatable spindle to effect the deformation of a longitudinal edge they may diverge outwards at their peripheral edges with respect to each other on the first part of the spindle, and then the roll deformation takes place in steps, one after another. In this embodiment of the invention, the roll deformation is facilitated because of a greater reduction of friction which occurs using roll deformation. Specifically, the step-by-step deformation also assures that the individual layers of paper, even in case of larger wall thickness and larger deformation force, are not damaged or shifted against each other.

DESCRIPTION OF DRAWINGS

The characteristics and advantages of this embodiment of the invention can be seen in the drawings, wherein FIG. 1 consisting of the FIGS. 1a and 1b shows a partial longitudinal section of the device for the manufacture of polygonal packaging sleeves.

DESCRIPTION OF PREFERRED EMBODIMENTS

Figures 1, 1A, 1B:
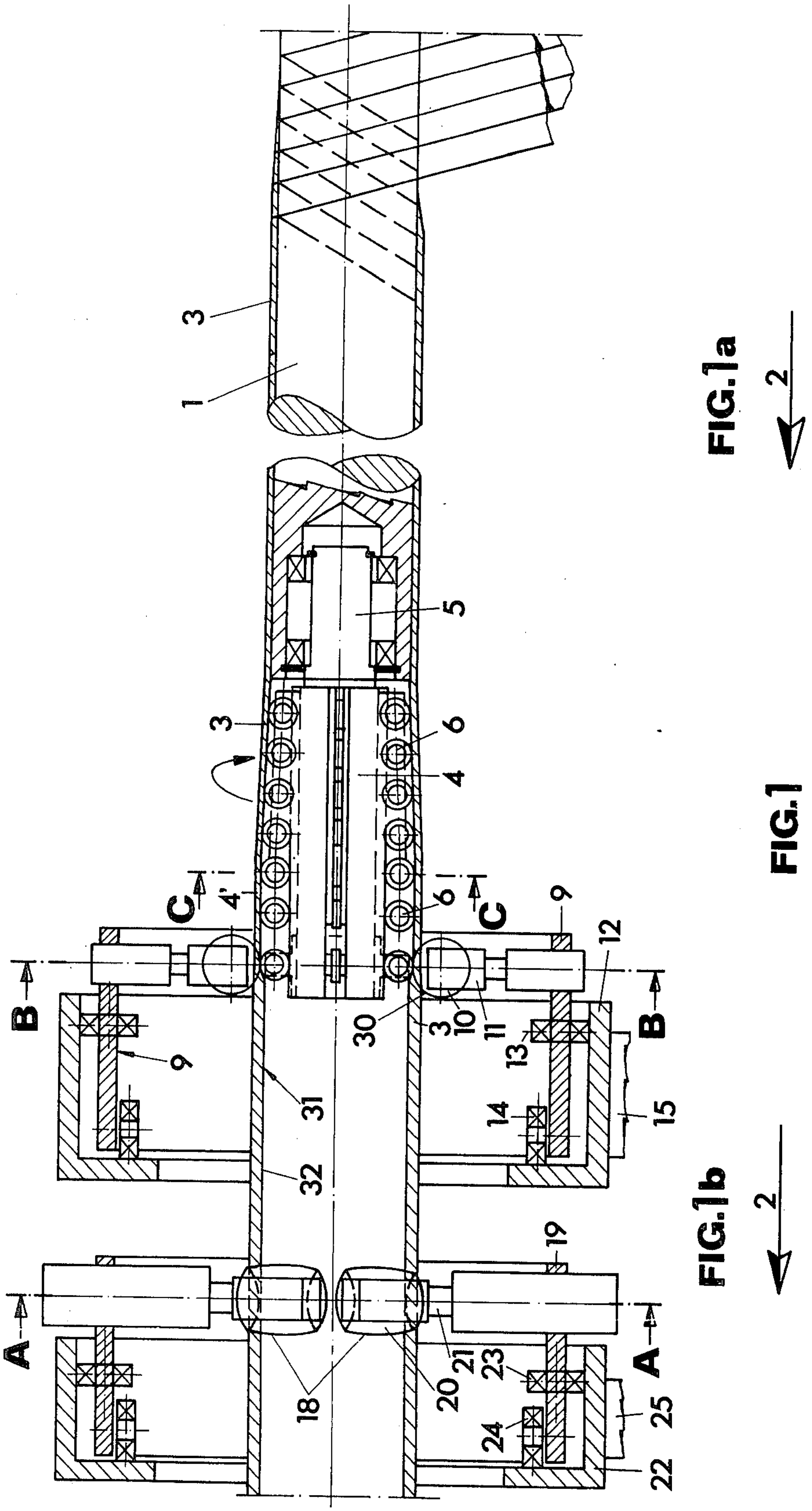
Figure 2:
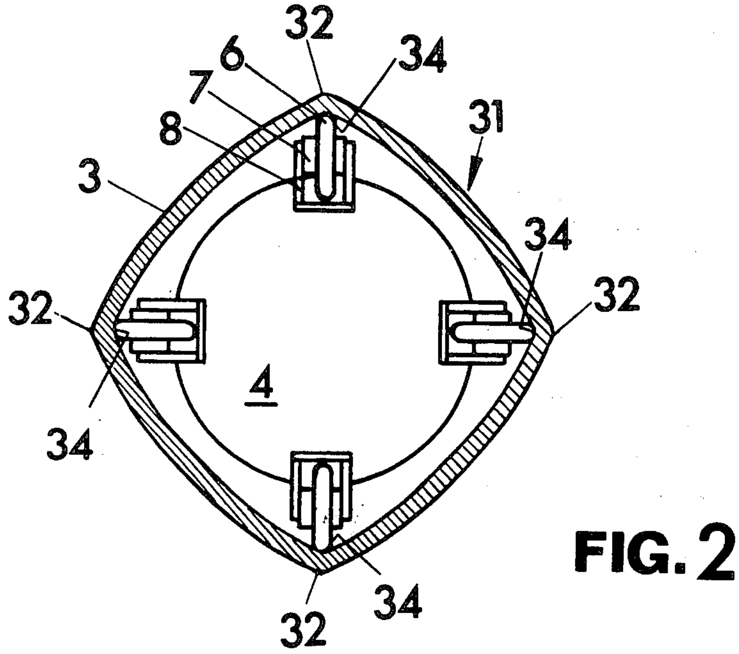
FIGS. 2 and 3 show schematic cross sections of the rotatable spindle according to FIG. 1 with variable roll or groove tools in the cross section C—C of FIG. 1, in the transition region from the round to the polygonal form of the packaging sleeve.
Figure 3:
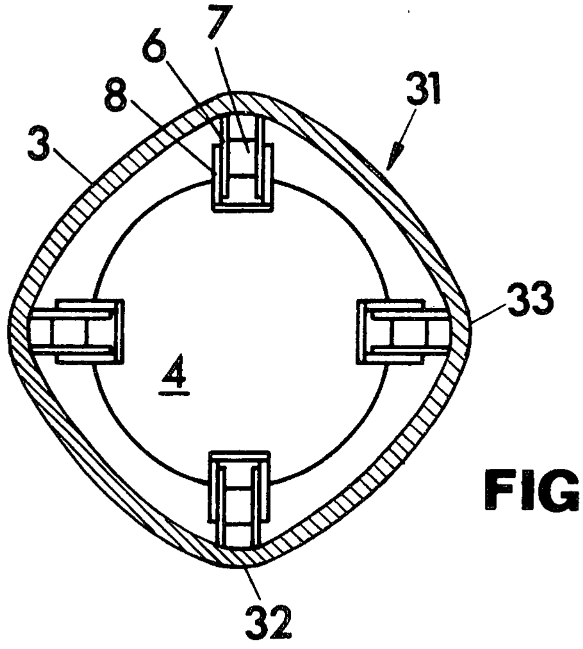
Figure 4:
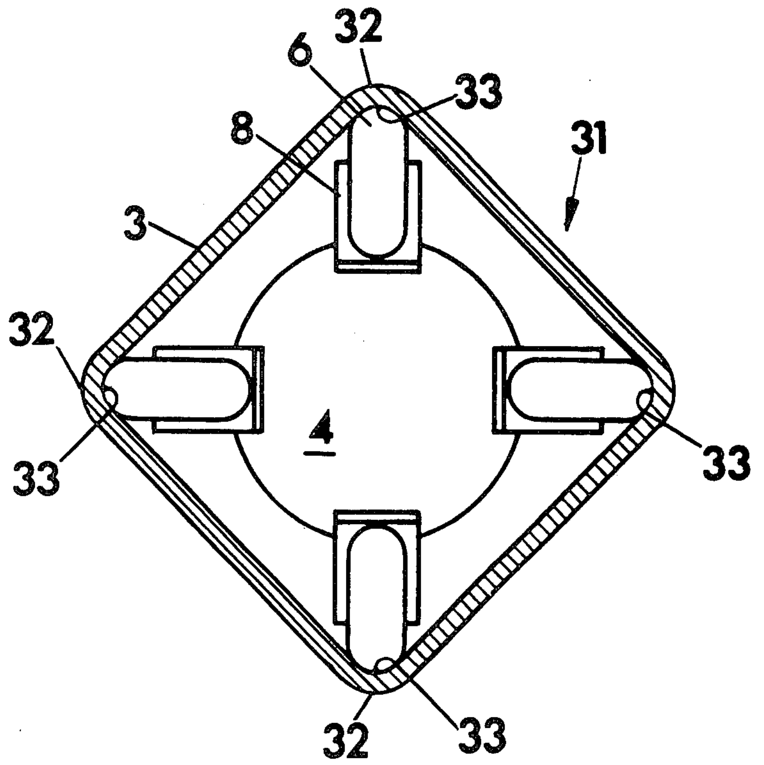
FIG. 4 shows a cross section of the rotatable spindle with roll wheels of the larger edges and curve radius according to cross section C—C in FIG. 1, whereby the radial outward diverging increase of the roller wheel rows corresponds to the diagonal members of the finished polygonal packaging sleeve form, so that a polygonal, non-foldable sleeve with rounded off longitudinal edges is produced.
Figure 9:
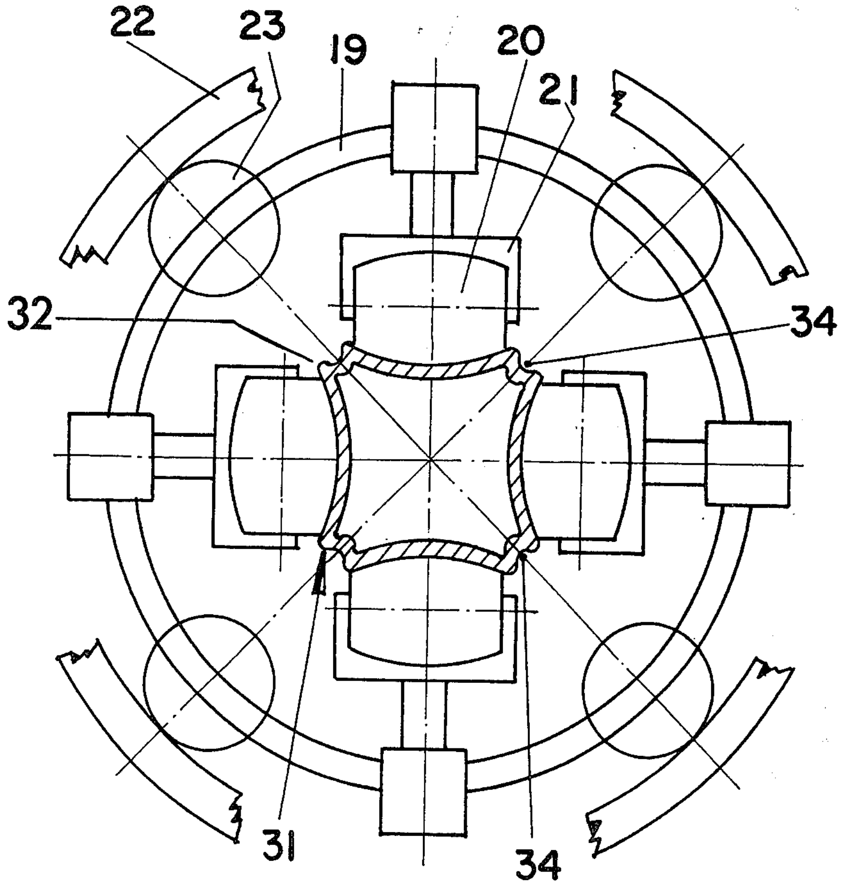

The polygonal packaging sleeve 31 is shown with various cross section shapes in FIGS. 2 to 4, as well as 6 to 8, within the device for manufacturing same, by a sample of a square sleeve form. Its edges could either be made as longitudinal edges 33 (FIGS. 3 and 4) which have stable edge forms, rounded off with a large curve radius, or provided with longitudinal grooves 34 which have comparable sharp-edged longitudinal edges 32 (FIGS. 1, 6 and 7) wherein the polygonal sleeve 31 can be folded easily, so that it can be folded together flat, diagonally and thereby can be stocked in a space saving manner and transported. By impressing grooves 34 into the still glue-moist sleeve wall, its wrapping layers are being variably stretched very much over the thickness of the wall or broken so that a kind of folding joint results, wherein in the folding edge not all positions of the layers are firmly glued together and can be folded relatively, a little toward each other. In this manner the material resists return into the original round form. On the other hand, the separation of the individually wrapping layers is avoided, in that, when the radially outward directed deformation takes place, a sharp pull or a tensile strain is exercised on the flat sides of the sleeve 31. Laminating can again be done, for instance, according to FIG. 9 in order to support the glueing process on the flat sides.

By attaching a cover (not shown) to the front opening of a foldable polygonal sleeve 31, or by slightly indenting a cover with press fit into the front opening, a flat foldable sleeve also receives the desired form-stable polygonal shape.

The device shown in FIG. 1 works in the case of packaging sleeve 31 — according to the drawing — from right to left (see arrow 2). FIG. 1 shows a stationary round wrapping spindle 1 of a conventional sleeve wrapping machine on which in a known manner strips of wrapping material are stacked in several layers and guided on to the wrapping spindle 1, parallel to each other, inclined to the longitidinal axis of spindle 1. By winding around a belt (not shown), the pre-glued strips of material are, when producing the sleeve, at the same time pulled off from the delivery spool, pressed under the loop of the belt and by constant rotation moved ahead, i.e. according to the direction arrow 2. In this manner results a theoretically endless round sleeve 3. The glueing process of the wrapped material which is started by the stretching of strips and by impressing the material as a result of the winding around the belt, occurs upon complete rotation of the round sleeve 3 to a severing device, so that a severing of the round sleeve 3 is possible. (not shown).

The device has, moreover a rotatable spindle 4 at the end of the stationary spindle 1, i.e. in a bearing 5 which extends the spindle coaxially. This spindle 4 carries several rows (2 or preferebly 4, but also three or any amount) of rotatably layered rollers 6, which are arranged radially to the longitudinal axis of the spindle, that the joint tangents of the rollers of each row, when joined to the side diverted from the spindle 4, form the edges of a regular pyramid, whose center line coincides with the longitudinal axis of spindle 4. If only two rows of rollers 6 are provided, they are situated in a plane which is cutting the longitudinal axis of spindle 4; that is, symmetrical to each other and divergent to the axis, according to direction arrow 2. The angle which is formed by the rows of rollers 6 with the longitudinal axis of spindle 4, is only as many degrees as are necessary for the deformation of the round sleeve to the polygonal form.

The rotatable spindle 4 does not have to be a solid cone or solid cylinder, but can consist of a shaft with bearings 8 for the rollers 6. The rollers 6 held by the bearings 8 consecutively conically increasing.

If a sleeve 3 wrapped on the stationary spindle 1 arrives at the moveable spindle 4, the sleeve is moved forward to the rollers 6 supported at its inside wall.

Since rollers 6 are positioned freely rotatable, no special energy consumption is necessary. Because of the diverging arrangement of the rows of rollers, the round sleeve 3 is expanded slowly from the inside by the push force of the belt and is converted from the original cylindrical form into a shape which corresponds to the shape of the rotatable spindle or to the course of the outer tangent of the rows of rollers 6. Since the round sleeve 3, because of the absorption of water contained in the glue retains its softness for some time, the wrapping material can be well shaped mechanically.

The sleeve receives, therefore, at first a cross section, as is shown, for instance in FIGS. 2 and 3, and then a final polygonal cross section, as in FIG. 4 according to the manner in which the rollers are positioned.

Since rollers 6, associated with the stationary wrapping spindle are not only means of transportation, but also serve increasingly as a pre-rolling tool, they form slowly by pressure on the interior wall of the sleeve its longitudinal edges 32 or 33, according to the profile of the sleeve without causing a slit in the inner wall of the sleeve.

Because of the only slight divergence of the rows of rollers 6, the material of the round sleeve 3 which is flexible because of the penetrated glue, can be deformed within certain limits or be formed into its forced upon shape, also into a rectangle.

In the embodiment of FIGS. 2, 3 and 4 at times 4 rows of rollers 6 are provided. The profile of these rollers 6, the hub 7 of which is positioned in a freely rotatable manner in U-shaped bearings, can be distinguished according to the kind of desired longitudinal edges. According to FIG. 2 the rollers 6 consist of relatively thin wheels, which can form a polygonal wrapping sleeve 31 with sharp longitudinal edges 32, also without an upper tool and however, without deep grooves.

According to FIG. 3 the rollers 6 consist of two parallel thin discs, kept apart by the hub 7 which form a double groove 34 with the spherical, drum-shaped rollers 6, according to FIG. 4, a polygonal wrapping sleeve 31, with considerably round-off longitudinal edges 33 can be produced.

If only three or more than four rows of rollers 6 are provided, a corresponding triangular, pentagonal, etc., cross section of sleeve may be achieved. With only two rows of rollers a two-edge results, whereby both sides are inclined to curve upwards due to the radial expansion of the rotatable spindle 4 from the plane where rollers 6 are arranged. Also, in the case of sleeves with 3 or more longitudinal edges by suitable shaping of the rotatable spindle 4 it is possible to retain, more or less, the curvature of the region between the longitudinal edges 32 of the sleeve and therefore, produce, for instance, a practically cylindrical sleeve with 4 edges (FIG. 5).

Figure 8:
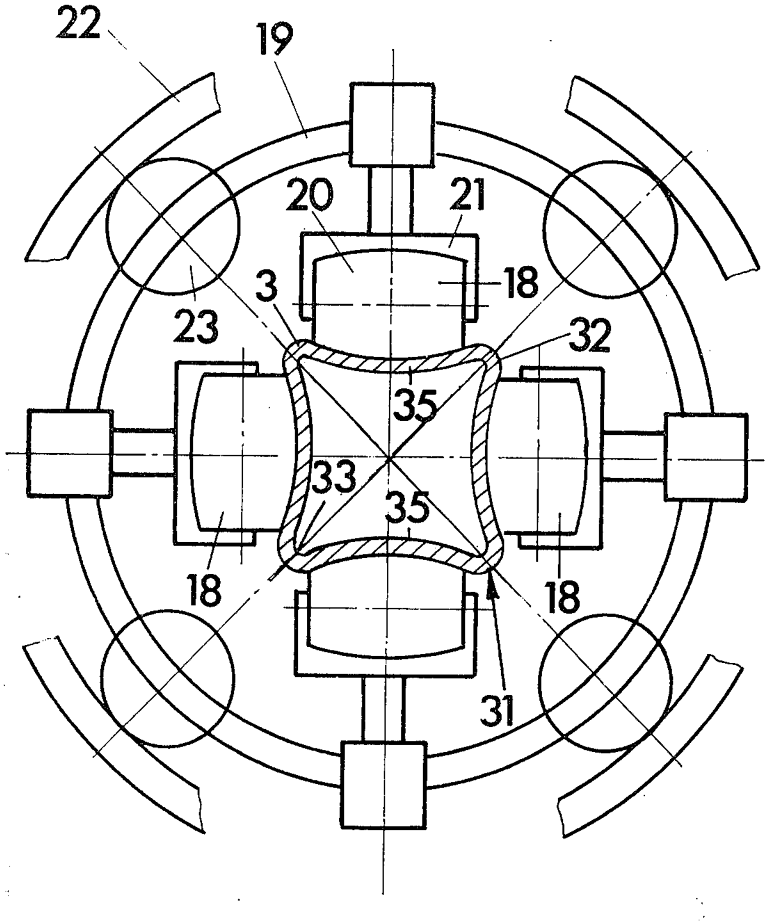
FIGS. 8 and 9 show cross sections along the lines A—A in FIG. 1(*a*) with a pressure mechanism for the support of the glueing process.

As soon as the sleeve 31 has obtained its highest possible stretch or polygonal deformation by the rollers 6 of the rotatable spindle 4, the rotatable spindle 4 changes over into a part 4[1] wherein the rows of rollers 6 run parallel. Here in line C—C of FIG. 1b the end step of the deformation of polygonal sleeves with rounded-off corners (FIG. 4) by rollers 6, is achieved. The insertion of an additional pressure station 18 (FIG. 8) is only necessary in the case of sleeves with considerable wall thickness in order to support satisfactory glueing of the wrapping material.

At the end of this part 4[1], which is also the end of the rotatable spindle 4, a groove station 30 (B—B in FIG. 1*b*, as well as FIGS. 5, 6 and 7) can be inserted. With this groove station two kinds of grooves 34 can be produced, depending upon the kind of inserted lower and upper roll-tools. These grooves can, as already mentioned, stretch the flat sides of the sleeve, reinforce their longitudinal edges 32 and at the same time make the wrapping sleeve 31 foldable.

Figure 5:
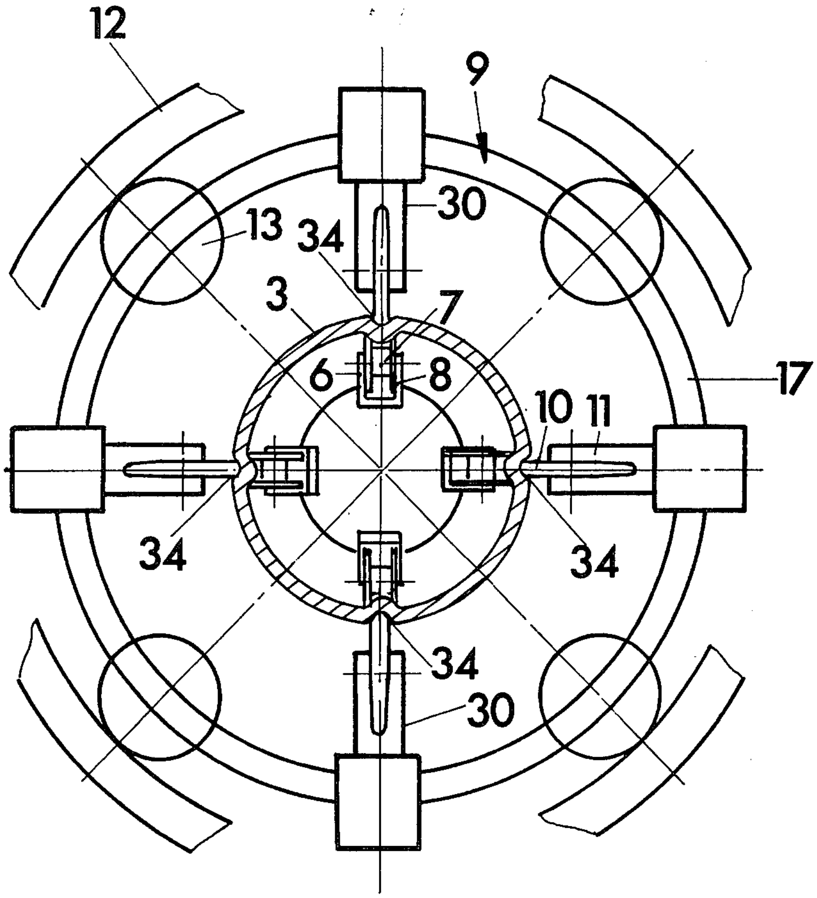
FIGS. 5, 6 and 7 show cross sections of groove deformation stations in the area B—B of FIG. 1(*b*) with various embodiments of the groove or roller deformation of the longitudinal edges of a polygonal packaging sleeve
Figure 6:
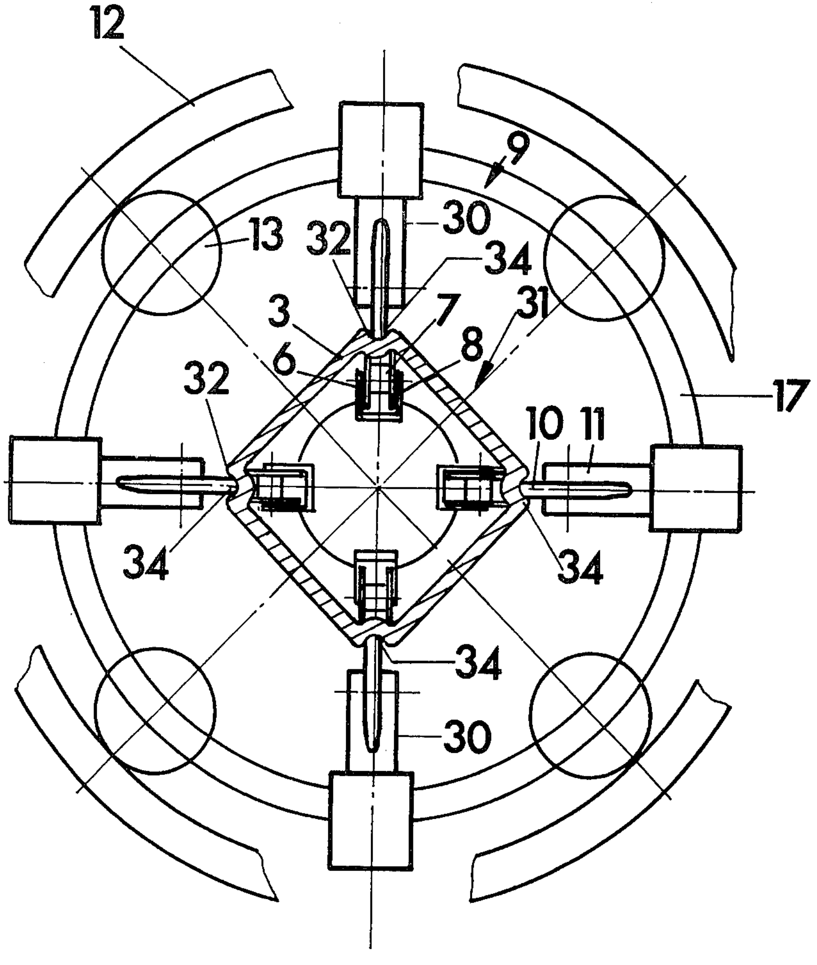
Figure 7:
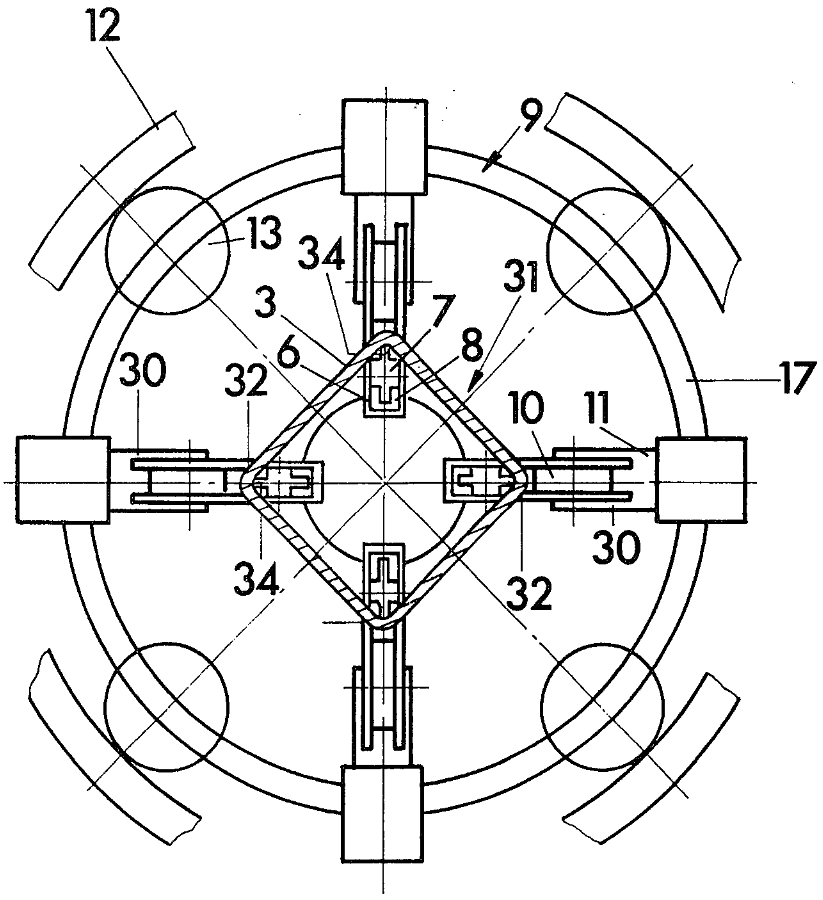

If a double scoring is accomplished with the inner rollers 6, according to FIGS. 5 and 6, an interior groove 34 can be produced (FIG. 5 and 6) with a thinner outer wheel 10 as upper tool. In this case, however, a narrow interior roller 6 as in FIG. 7 is inserted for the polygonal deformation with the double outer wheel 10 as an upper tool. The required, adjustable rollers 6 or outer wheels 10 for the additional outer scoring, which produce grooves 34, are rotatably positioned at a ring-shaped support 9 in U-shaped bearings 11. This support 9 consists of a ring 17 coaxial to the spindle or sleeve axis which ring is also positioned rotatably in a coaxial ring-shaped guide 12 on rollers 13 and 14 and can therefore follow the rotation of the sleeve. Ring 12 is attached to the support 15 of the machine (not shown).

The pressure station 18 (A—A of FIG. 1*b* or FIGS. 8 and 9) can optionally be inserted between the ends of the rotatable spindle 4 or after the grooving station respectively and the separation device (not shown), when it is necessary for the retention of shape or support of the glueing process of the sleeve by lightly pressing rollers 20. The convex tightening shown in FIGS. 8 and 9 serves as a means for the previously mentioned purpose, but can also be more or less necessary for the shaping of the flat sides, specifically in the case of wrapping sleeves 31 with considerable wall thickness. The construction of the pressure station 18 (FIG. 1*b* A—A) is similar to that of the grooving station 30. The rollers 20 can be developed as more or less cambered rolls which, however, do not affect the groove furrows of the already produced polygonal sleeve, but can only roll over the in between lying surface of the packaging sleeve 31 between such furrows. The cambered rolls 20 are kept in adjustable bearings 21, in a freely rotating ring-shaped support 19, which, for its part, circulates in a stable ring-shaped housing 22 on wheels 23 and is supported by an axial ball bearing 24. The houseing 22 can be attached to a detached post (not shown) with a bearing 25 to the separation device or also between the end of the rotatable spindle 4.

The inward warping of the sleeve areas with rollers 20 are shown in an exaggerated manner. Generally, a small tightening pressure is sufficient to smoothly press the slight curving of the flat sides of the sleeves. Therefore, the tightening station is only an auxiliary tool which is not absolutely necessary for the manufacture of a polygonal sleeve, according to the described grooving process.

Only the manufacture of foldable polygonal packaging sleeves 31 employs the grooving method, whereby the texture of the wrapping material in the case of grooves 34, are additionally broken in such a manner that the material does not return to its original form and moreover is also foldable after final hardening. There is a foldability because the material is flexible in the area of grooving, that is, that the wrapping sleeve 21 shown in the drawing having grooves 34 diametrically opposite from each other, in pairs, can take any prismatic form with edge angles between 180°. In other words, the sleeve can not only be placed completely flat, but also in polygonal form, or, see FIG. 5, can be erected again in near cylindrical form. The cylindrical form can also be achieved with a sleeve which has only two diametrically opposite grooving furrows, in the cross section, therefore, the form of a two-edge with convex or concave sides, according to the kind of grooving furrows. The originally round shape of the sleeve can be established again by turning it up on a wrapping spindle or by attaching impressed covers or covers in inverted position.

The endless polygonal packaging sleeves 31 produced according to the described method can be separated, as a fule, with known cutting saws, as they are employed in the case of round sleeve wrapping machines, into the desired size. In the case of larger sleeve cross section sizes, a change in the saw cam is necessary.

The separation of the flatly folded sleeves in smaller sections can be done with a crosscutter or with a bridge punch with which also a sleeve clasp, with simple tools, as is usual in the case of folding cartons, can be punched at both ends.

Polygonal packaging sleeves 31 which show in the erected state the cross section of a square or also of a rectangle, do not only have the advantage of being foldable flat, and thereby can be stored and transported without waste of space, but also have the additional advantage of using far less space in the erected state next to each other and one after another flat or erected, than sleeves with round or oval cross sections. They can, therefore, be compared in their mechanical characteristics of resistance to bursting and strain with the conventional sleeves.

I claim:

1. A substantially flat-sided, polygonal, tubular packaging sleeve comprising, spirally overlayed layers of strips made from material which is selectively softenable by the application of bonding material thereto and remains softened thereby until said bonding material has set, and is susceptible to stretching deformation while in the softened state, said strips having been bonded together by a bonding material which, until is set, caused the material from which at least some of said layers are made to be softened, said sleeve having longitudinally oriented corners between the sides thereof, each of which comprises an impressed bend in the wall of said sleeve with associated stretching deformation of at least some of the constituent layers.

2. The article described in claim 1 wherein said corners are rounded and the constituent layers in the regions of the corners are substantially completely abutting, and bonded to, each other.

3. The article described in claim 1 adapted to be folded flat by the corner bends having impressed grooves therein with at least some portions of the constituent layers of material in the region of said bends being out of abuttment and unbonded with respect to each other.

4. The article described in claim 3 wherein each of said bends comprises a groove impressed in the wall of said sleeve.

5. The article described in claim 4 wherein each of said grooves is impressed in the outer wall of said sleeve.

6. The article described in claim 4 wherein each of said grooves is impressed in the inside wall of said sleeve.

7. The article described in claim 3 wherein each of said bends bows outward with respect to the center of said sleeve and is bordered by longitudinal grooves impressed in the exterior of the walls of said sleeve in the region of said corners.

8. The article described in claim 6 wherein each of said bends bows outward with respect to the center of said sleeve and is bordered by longitudinal grooves impressed in the exterior of the walls of said sleeve in the region of said corners.

9. The article described in claim 3 wherein each of said bends bows inward toward the center of said sleeve and is bordered by longitudinal grooves impressed in the interior of the walls of said sleeve in the region of said corners.

10. The article described in claim 5 wherein each of said bends bows inward toward the center of said sleeve and is bordered by longitudinal grooves impressed in the interior of the walls of said sleeve in the region of said corners.

* * * * *